(12) United States Patent
Tominaga et al.

(10) Patent No.: US 6,819,648 B1
(45) Date of Patent: *Nov. 16, 2004

(54) OPTICAL SAMPLE AND METHOD OF WRITING AND READING INFORMATION ON THE SAME

(75) Inventors: Junji Tominaga, Tsukuba (JP); Nobufumi Atoda, Tsukuba (JP); Hiroshi Fuji, Kyoto (JP); Hiroyuki Katayama, Nara (JP); Kenji Ohta, Nara (JP)

(73) Assignees: Agency of Industrial Science and Technology, Tokyo (JP); Sharp Kabushiki Kaisha, Osaka (JP)

( * ) Notice: Subject to any disclaimer, the term of this patent is extended or adjusted under 35 U.S.C. 154(b) by 713 days.

This patent is subject to a terminal disclaimer.

(21) Appl. No.: 09/585,554

(22) Filed: Jun. 2, 2000

(30) Foreign Application Priority Data

Jun. 4, 1999 (JP) .......................................... 11-158612

(51) Int. Cl.$^7$ ................................................ G11B 7/00
(52) U.S. Cl. .............................. 369/112.24; 369/275.4; 369/285
(58) Field of Search ................................. 369/100, 284, 369/285, 275.5, 288, 277, 112.24, 118, 13.33, 275.1, 112.01, 44.23, 112.26, 94, 275.4, 283; 428/141; 430/270.12

(56) References Cited

U.S. PATENT DOCUMENTS

| | | | | |
|---|---|---|---|---|
| 4,178,403 A | * | 12/1979 | Sakurai et al. | ............... 428/209 |
| 4,954,380 A | * | 9/1990 | Kanome et al. | ............ 428/64.8 |
| 5,065,390 A | * | 11/1991 | Miyauchi et al. | ...... 369/112.22 |
| 5,099,270 A | * | 3/1992 | Pearson et al. | ............... 355/32 |
| 5,208,088 A | * | 5/1993 | Tominaga et al. | ......... 428/64.5 |
| 5,350,484 A | * | 9/1994 | Gardner et al. | ............. 438/669 |
| 5,436,885 A | * | 7/1995 | Okumura et al. | ........ 369/275.2 |
| 5,453,346 A | * | 9/1995 | Kawahara et al. | ..... 430/270.13 |
| 5,592,461 A | * | 1/1997 | Tsujioka et al. | ............ 369/126 |
| 5,910,940 A | * | 6/1999 | Guerra | .................... 369/275.1 |
| 6,094,413 A | * | 7/2000 | Guerra | .................... 369/275.1 |
| 6,226,258 B1 | * | 5/2001 | Tominaga et al. | .......... 369/283 |
| 6,319,582 B1 | * | 11/2001 | Tominaga et al. | ......... 428/64.1 |
| 6,661,745 B1 | * | 12/2003 | Tominaga et al. | ....... 369/13.33 |

OTHER PUBLICATIONS

Tominaga et al ,"An approach for recording and readout beyond the diffraction limit with an Sb thin film ", Applied physics letters, vol. 73, No. 15, pp. 2078–2080, received Apr. 13, 1998; accepted for publication Aug. 10, 1998.*

J. Tominaga et al, "An approach for recording and readout beyond the diffraction limit with an Sb thin film", Applied Physics Letters, vol. 73, No. 15, pp. 2078–2080, received Apr. 13, 1998; accepted for publication Aug. 10, 1998.

N. Atoda et al, "Super–RENS—Super–Resolution Near–Field Structure", Journal of Electronics, pp. 100–102, Oct. 1998.

* cited by examiner

Primary Examiner—William Korzuch
Assistant Examiner—Kimlien T. Le
(74) Attorney, Agent, or Firm—Birch, Stewart, Kolasch, & Birch, LLP.

(57) ABSTRACT

An optical sample includes a mask layer made of a material in which an aperture is produced by a chemical change, which is reversible, upon application of heat or light, and a recording layer provided at a position where an evanescent field produced in the aperture when light is applied to the mask layer can reach. Since the aperture is produced in the mask layer by a chemical change, it can be opened and closed at a high speed and hence a high-speed transfer of information can be achieved.

14 Claims, 4 Drawing Sheets

OPTICAL SAMPLE AND METHOD OF WRITING AND READING INFORMATION ON THE SAME

FIELD OF THE INVENTION

The present invention relates to an optical sample used for optical writing and/or optical reading beyond the diffraction limit of light using an evanescent field, and also relates to a method for writing and reading information on the optical sample.

BACKGROUND OF THE INVENTION

In recent years, various high-density recording methods using a near field (evanescent field) have been developed. For instance, a reading or writing method using an evanescent field for an optical memory is disclosed in a magazine "Electronics", October issue, 1998, pp. 100–102, (published by Ohm Corp.) and in a paper "Applied Physics Letters, Vol. 73, No. 15, published on Oct. 12, 1998, pp. 2078–2080". This method will be explained with reference to FIG. 4.

For example, in an optical disk 101 as an optical memory, a protective layer 112, a mask layer 113, a protective layer 114, a recording layer 115 and a protective layer 116 are deposited in this order on a substrate 111. A phase change material $Ge_2Sb_2Te_5$ is used for the recording layer 115, and an antimony film is used for the mask layer 113.

For writing and reading of information on the optical disk 101, a laser beam 102 focused by an objective lens (not shown) is applied to the optical disk 101. The antimony film (the mask layer 113) shows a change in the refractive index at a high-temperature portion corresponding to the center of the projected laser spot. As a result, an aperture 103 smaller than the diameter of the spot is produced in the mask layer 113. The aperture 103 is an area of the mask layer 113 which has changed to have a higher transmittance of light. Therefore, for example, during reading of information from the optical disk 101, a mark 104 recorded on the recording layer 115 is read through the aperture 103.

The thickness of the protective layer 114 between the mask layer 113 and the recording layer 115 is set for a distance which allows the evanescent field 105 produced by the aperture 103 to reach the recording layer 115. With this setting, it is possible to record or reproduce a recorded mark of no larger than 100 nm.

However, with the above-mentioned conventional structure, since the aperture 103 is produced using a change of phase of the antimony film from a crystalline state to an amorphous state, the opening and closing speed of the aperture 103 can not be sufficiently increased with respect to a change in temperature. It is thus difficult to increase the opening and closing speed of the aperture 103 in accordance with a rise of the linear velocity, and impossible to perform recording and reproduction of information by a high-speed transfer.

SUMMARY OF THE INVENTION

In order to solve the above-mentioned problems, an object of the present invention is to provide an optical sample capable of opening and closing an aperture at a high speed and performing high-speed reading and/or high-speed writing of information by a high-speed transfer, and a method of writing and reading information on the optical sample.

In order to achieve the above-mentioned object, an optical sample of the present invention includes a mask layer made of a material in which a refractive index change region is produced by a chemical change upon application of heat or light, the chemical change being reversible, and a sample layer provided at a position where an evanescent field produced in the refractive index change region when light is applied to the mask layer can reach.

According to this structure, the refractive index change region is produced by a chemical change upon application of heat or light to the mask layer. In the state in which the refractive index change region is produced, when light is applied to the mask layer, an evanescent field that reaches the sample layer is produced in the refractive index change region. Therefore, the information which is, for example, recorded at a high density on the sample layer can be read with high resolution by the mutual function of the evanescent field and the sample layer.

In this reading operation, since the refractive index change region, i.e., an optical aperture is produced in the mask layer by a chemical change, the aperture can be opened and closed at a speed higher than that in a structure where an aperture is formed by using a change of phase of the mask layer from a crystalline state to an amorphous state.

It is thus possible to read the information from the sample layer (for example, a recording layer) of the optical sample (for example, an optical disk as an optical recording medium) at a high speed.

A method of reading information on an optical sample having a mask layer made of a material in which a refractive index change region is produced by a chemical change upon application of heat or light, the chemical change being reversible, and a sample layer provided at a position where an evanescent field which is produced in the refractive index change region when light is applied to the mask layer can reach, includes producing locally the refractive index change region in the mask layer with application of a light beam to the mask layer, and reading information from the sample layer by a mutual function of the evanescent field produced in the refractive index change region and the sample layer.

According to this structure, the evanescent field that can reach the sample layer is produced in the refractive index change region with application of light to the mask layer, and information which is, for example, recorded at a high density on the sample layer can be read with high resolution by the mutual function of the evanescent field and the sample layer.

Moreover, in this reading operation, since the refractive index change region, i.e., an optical aperture can be opened and closed at a high speed by a chemical change in the mask layer, it is possible to read information from the sample layer (for example, a recording layer) of the optical sample (for example, an optical disk as an optical recording medium) at a high speed.

A method of writing and reading information on an optical sample having a mask layer made of a material in which a refractive index change region is produced by a chemical change upon application of heat or light, the chemical change being reversible, and a sample layer capable of recording information by an optical change, the sample layer being provided at a position where an evanescent field which is produced in the refractive index change region when light is applied to the mask layer can reach, includes producing locally the refractive index change region in the mask layer with application of a light beam to the mask layer, and writing or reading information on the sample layer by a mutual function of the evanescent field produced in the refractive index change region and the sample layer.

According to this structure, the evanescent field that can reach the sample layer is produced in the refractive index change region when light is applied to the mask layer, and the information which is, for example, recorded at a high density on the sample layer can be read with high resolution by the mutual function of the evanescent field and the sample layer. Furthermore, it is possible to write information on the sample layer.

In the reading operation and writing operation, since the refractive index change region, i.e., an optical aperture can be opened and closed at a high speed by a chemical change in the mask layer, it is possible to write and read information on the sample layer (for example, a recording layer) of the optical sample (for example, an optical disk as an optical recording medium) at a high speed.

For a fuller understanding of the nature and advantages of the invention, reference should be made to the ensuing detailed description taken in conjunction with the accompanying drawings.

BRIEF DESCRIPTION OF THE DRAWINGS

FIG. 1(*b*) is a graph showing a temperature distribution on a mask layer shown in FIG. 1(*a*).

DESCRIPTION OF THE PREFERRED EMBODIMENTS

Figure 1A:
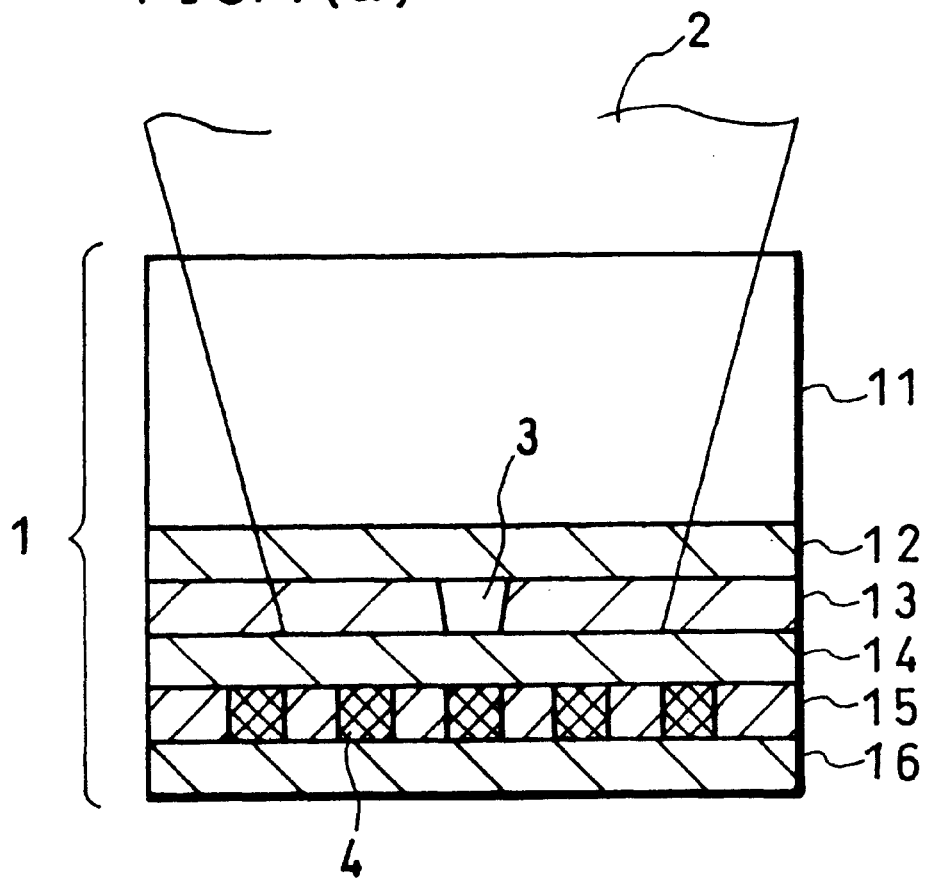
FIG. 1(*a*) is a vertical cross section showing the structure of an optical disk as an optical sample according to one embodiment of the present invention and a recording and reproducing method with respect to the optical disk.
Figure 1B:
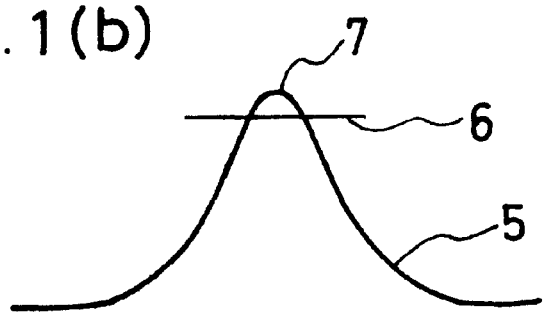
Figure 2:
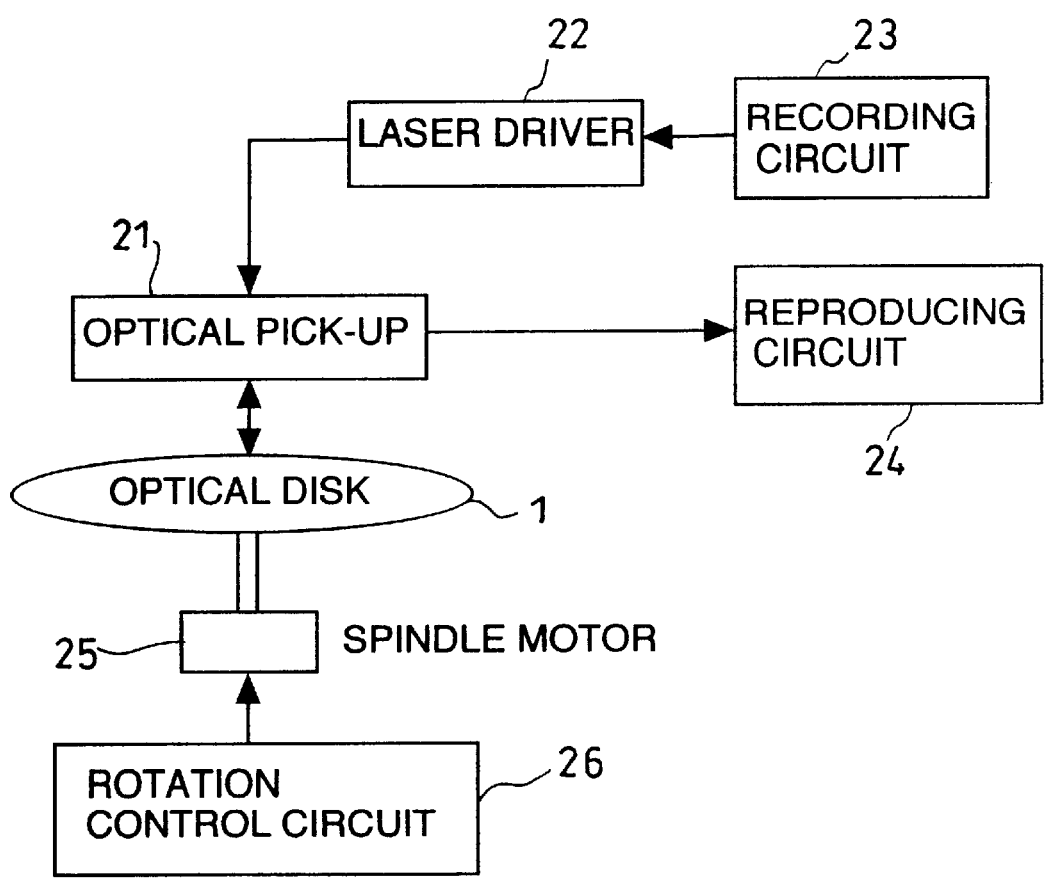
FIG. 2 is a block diagram showing an optical information recording and reproducing device for recording and reproducing information on the optical disk shown in FIG. 1.
Figure 3:
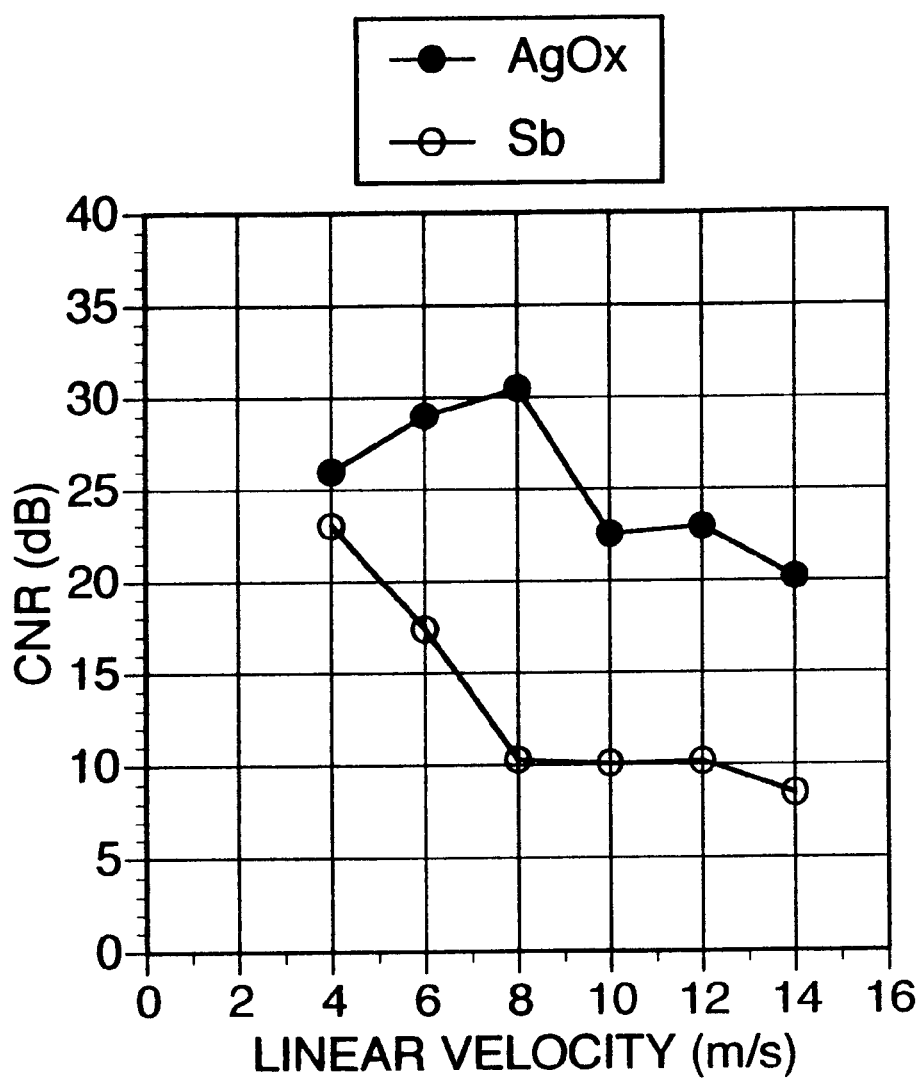
FIG. 3 is a graph showing the results of measuring the optical disk shown in FIG. 1 and an optical disk of a comparative example for the dependence of the CNR (carrier to noise ratio) on the linear velocity.
Figure 4:
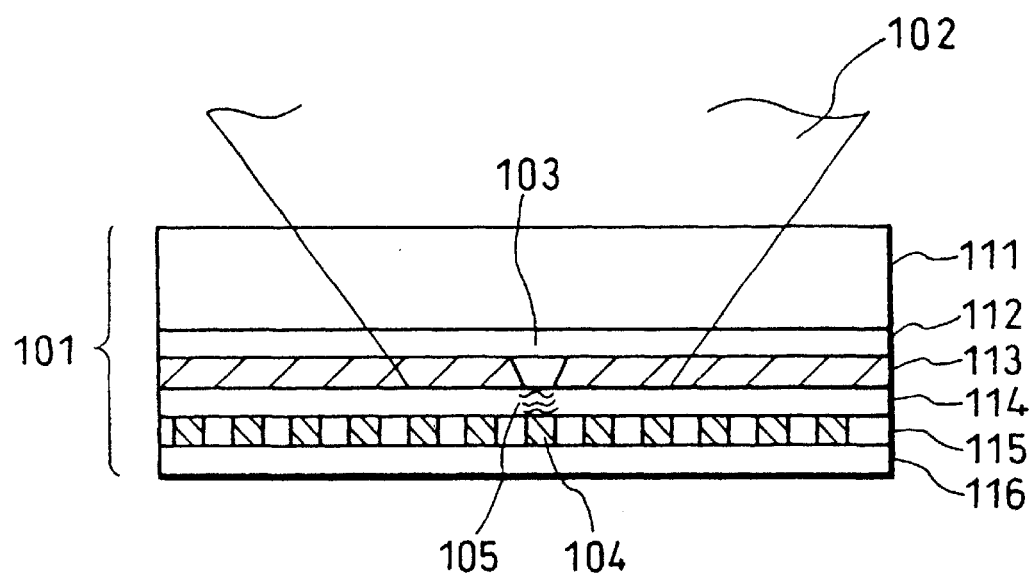
FIG. 4 is a cross section showing the structure of a conventional optical disk, and a recording and reproducing method with respect to this optical disk.

Referring to FIGS. 1 to 3, the following description will explain one embodiment of the present invention.

An optical sample according to this embodiment is produced as an optical disk 1 shown in FIG. 1(*a*). The optical disk 1 includes a protective layer (first protective layer) 12, a mask layer 13, a protective layer (second protective layer) 14, a recording layer (sample layer) 15 and a protective layer 16 formed in this order on a substrate 11.

The substrate 11 is made of, for example, polycarbonate and has a thickness of 0.6 mm. The protective layers 12, 14 and 16 are made of Zns—$SiO_2$, and have a thickness of 170 nm, 20 nm and 20 nm, respectively. In particular, the thickness of the protective layer 14 between the mask layer 13 and the recording layer 15 is set for a dimension which allows an evanescent field produced by an aperture described later to reach the recording layer 15.

A recorded mark 4 is recorded on the recording layer 15 by, for example, phase change recording. As a phase change material for the recording layer 15, an alloy of Ge, Sb and Te can be used.

The mask layer 13 is made of a material which shows a chemical change as the temperature or the amount of light applied changes. In this optical disk 1, silver oxide is used as the above material. A chemical change in silver oxide is decomposition of silver oxide into oxygen and silver.

More specifically, for example, when the laser beam 1 focused by an objective lens (not shown) is applied to the optical disk 1 to project a laser spot onto the mask layer 13, a high-temperature portion 7 exceeding a threshold value 6 on a temperature distribution 5 of the mask layer 13 appears as shown in FIG. 1(*b*), and silver oxide in this high-temperature portion 7 shows a chemical change, i.e., is decomposed into oxygen and silver, and hence the refractive index changes. As a result, the aperture 3 as a refractive index change region which is smaller than the diameter of the spot is produced in the mask layer 13. Incidentally, although the aperture 3 is a scatterer formed by silver during the decomposition, the scatterer is referred to as the aperture here for the sake of explanation. Then, writing and reading of the recorded mark 4 on the recording layer 15 can be carried out by the aperture 3, i.e., an evanescent field produced in the aperture 3.

Moreover, since silver oxide forming the mask layer 13 produces the aperture 3 by a chemical change resulting from a change in the temperature and the amount of light applied, the response speed during the formation of the aperture 3 is in the picosecond order. Thus, by using silver oxide which forms the aperture 3 by a chemical change as the material for the mask layer 13, the aperture 3 can be opened and closed at a speed higher than a structure where the aperture 3 is formed using a change of phase from a crystalline state to an amorphous state, for example, where antimony is used as the material for the mask layer 13.

A recording and reproducing device for recording and reproducing information on the optical disk 1 has the structure shown by the block diagram of FIG. 2. This recording and reproducing device includes an optical pickup 21, a laser drive circuit 22, a recording circuit 23, a reproducing circuit 24, a spindle motor 25 and a rotation control circuit 26.

In this recording and reproducing device, during recording of information on the optical disk 1, a recording signal output from the recording circuit 23 is sent to a semiconductor laser in the optical pickup 21 through the laser drive circuit 22 and output as a laser beam 2 of a relatively strong intensity. The optical pickup 21 includes an objective lens (not shown) to focus the laser beam 2 as a laser spot on the optical disk 1.

On the other hand, during reproduction, the laser beam 2 of a relatively weak intensity is applied from the optical pickup 21 to the optical disk 1, and the reflected light is converted into an electrical signal by a photodetector in the optical pickup 21 and reproduced by the reproducing circuit 24.

An adjustment of the amount of light of the laser beam 2 is performed by the laser drive circuit 22 to control the evanescent field to be optimum in the mask layer 13 of the optical disk 1. Furthermore, the spindle motor 25, i.e., the rotation of the optical disk 1, is controlled to a predetermined rotation speed by a control signal output from the rotation control circuit 26 to the spindle motor 25.

According to the above-described structure, the following description will explain a recording and reproducing method using the optical disk 1.

As described above, when the laser spot is projected onto the mask layer 13 by the application of the laser beam 2 to the optical disk 1 by the optical pickup 21, a portion of the mask layer 13 corresponding to the center portion of the laser spot has a high temperature, and silver oxide (the mask layer 13) in this portion shows a chemical change. With this chemical change, silver oxide (the mask layer 13) shows a change of refractive index and hence the aperture 3 smaller than the laser beam spot is produced.

Besides, an evanescent field is produced in the aperture 3, and writing and reading of the recorded mark 4 on the recording layer 15 can be carried out by the mutual function of the evanescent field and the recording layer 15.

In addition, since the aperture 3 is formed by a chemical change of silver chloride forming the mask layer 13, the aperture 3 can be opened and closed at a high speed as described above. Consequently, the data transfer rate to the optical disk 1 can be improved. As a result, by rotating the optical disk 1 at a speed higher than a conventional speed, high-density recording on the optical disk 1 can be achieved with a high S/N at a high speed, and the high-density recorded data can be reproduced with a high S/N at a high speed.

Next, FIG. 3 shows the results of comparative tests performed on the optical disk 1 (of this embodiment) using silver oxide (AgOx) as the material for the mask layer 13 and an optical disk (of a comparative example) sing antimony (Sb) for the mask layer 13.

Here, the dependence of the CNR (carrier to noise ratio) of the reproduced signal on the linear velocity as measured. The conditions for the measurements are 635 nm for the laser wavelength, 0.6 for the NA of the objective lens, 0.6 $\mu$m for the track width, and 250 nm for the recorded mark length.

As shown in FIG. 3, it was understood from the results of the measurement that the optical disk 1 using silver oxide (AgOx) for the mask layer 13 is more suitable for a high-speed transfer than the optical disk (comparative example) using antimony (Sb) for the mask layer 13.

Incidentally, in the optical disk 1 of this embodiment, silver oxide is used as the material for the mask layer 13. However, it is possible to use antimony oxide or tellurium oxide in place of silver oxide. These materials include silver oxide and can be readily deposited on the substrate 11 by, for example, sputtering, and hence they are excellent in terms of the mass-productivity.

Moreover, in the optical disk 1, the protective layers 12 and 14 are provided on and under the mask layer 13, respectively. The provision of the protective layers 12 and 14 is preferable to prevent the substrate 11 and the recording layer 15 from being destroyed by a chemical change in the mask layer 13. With this structure, it is possible to cause a stable chemical change in the mask layer 13.

Furthermore, the above example illustrates the application of the structure of the present invention to information recording. However, the present invention is not necessarily limited to the above-described example, and is applicable to a variety of fields such as microscopes and high-precision linear scales, which can be designed to read information on the sample layer through the mask layer.

The optical sample of the present invention includes the mask layer made of a material in which the refractive index change region is produced by a chemical change upon application of heat or light, the chemical change being reversible, and the sample layer capable of recording information by an optical change, the sample layer being provided at a position where the evanescent field produced in the refractive index change region when light is applied to the mask layer can reach.

With this structure, the refractive index change region is produced by causing a chemical change in the mask layer with the application of heat or light. In the state in which the refractive index change region is produced, when light is applied to the mask layer, the evanescent field which can reach the sample layer is produced in the refractive index change region. Therefore, the information which is, for example, recorded at a high density on the sample layer can be read with high resolution by the mutual function of the evanescent field and sample layer.

In the reading operation and writing operation, since the refractive index change region, i.e., an optical aperture is produced in the mask layer by a chemical change, the aperture can be opened and closed at a speed higher than that in a structure where an aperture is formed by using a change of phase of the mask layer from a crystalline state to an amorphous state.

Consequently, it is possible to write and read the information on the sample layer (for example, a recording layer) of the optical sample (for example, an optical disk as an optical recording medium) at a high speed.

The above optical sample may be designed so that the mask layer is formed by silver oxide, antimony oxide or tellurium oxide.

According to this structure, the mask layer is formed by one of silver oxide, antimony oxide and tellurium oxide. When the mask layer is formed by one of silver oxide, antimony oxide and tellurium oxide, it can be easily formed by an industrial method and hence the optical sample can be readily mass-produced.

The above optical sample may be designed so that a first protective layer is formed on a side of the mask layer opposite to the sample layer side thereof and a second protective layer is formed on the sample layer side of the mask layer.

According to this structure, the first and second protective layers can prevent the layers provided on both sides of the mask layer, for example, a substrate and a sample layer, from being destroyed by a chemical change in the mask layer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical sample comprising:
   a mask layer made of a material in which a refractive index change region is produced by chemical decomposition upon application of heat or light, the chemical decomposition being reversible; and
   a sample layer provided at a position where an evanescent field can reach, which evanescent field is produced in the refractive index change region when light is applied to said mask layer.

2. The optical sample as set forth in claim 1, wherein said mask layer is made of silver oxide, antimony oxide or tellurium oxide.

3. The optical sample as set forth in claim 2, wherein said mask layer is formed by sputtering.

4. The optical sample as set forth in claim 1, wherein a first protective layer is formed on a side of said mask layer opposite to a sample layer side thereof, and a second protective layer is formed on the sample layer side of said mask layer.

5. The optical sample as set forth in claim 1, wherein said sample layer is a recording layer on which information is recorded.

6. The optical sample as set forth in claim 1,
wherein said sample layer is made of a phase change material.

7. An optical sample comprising:
a mask layer made of a material in which a refractive index change region is produced by chemical decomposition upon application of heat or light, the chemical decomposition being reversible; and
a sample layer capable of recording information by an optical change, said sample layer being provided at a position where an evanescent field can reach, which evanescent field is produced in refractive index change region when light is applied to said mask layer.

8. The optical sample as set forth in claim 7,
wherein said mask layer is made of silver oxide, antimony oxide or tellurium oxide.

9. The optical sample as set forth in claim 8,
wherein said mask layer is formed by sputtering.

10. The optical sample as set forth in claim 7,
wherein a first protective layer is formed on a side of said mask layer opposite to a sample layer side thereof, and a second protective layer is formed on the sample layer side of said mask layer.

11. The optical sample as set forth in claim 7,
wherein said sample layer is a recording layer on which information is recorded.

12. The optical sample as set forth in claim 7,
wherein said sample layer is made of a phase change material.

13. A method of reading information on an optical sample including a mask layer made of a material in which a refractive index change region is produced by chemical decomposition upon application of heat or light, the chemical decomposition being reversible, and a sample layer provided at a position where an evanescent field can reach, which evanescent field is produced in the refractive index change region when light is applied to said mask layer, said method comprising producing locally the refractive index change region in said mask layer with application of a light beam to said mask layer, and reading information from said sample layer by a mutual function of the evanescent field produced in the refractive index change region and said sample layer.

14. A method of writing and reading information on an optical sample including a mask layer made of a material in which a refractive index change region is produced by chemical decomposition upon application of heat or light, the chemical decomposition being reversible, and a sample layer capable of recording information by an optical change, said sample layer being provided at a position where an evanescent field can reach, which evanescent field is produced in the refractive index change region when light is applied to said mask layer, said method comprising producing locally the refractive index change region in said mask layer with application of a light beam to said mask layer, and writing or reading information on said sample layer by a mutual function of the evanescent field produced in the refractive index change region and said sample layer.

* * * * *